United States Patent [19]

Lemonnier

[11] 3,908,141

[45] Sept. 23, 1975

[54] EDDY CURRENT RETARDER

[75] Inventor: Daniel Claude Lemonnier, Paris, France

[73] Assignee: Labavia S.G.E., Paris, France

[22] Filed: Oct. 15, 1974

[21] Appl. No.: 514,786

[30] Foreign Application Priority Data
Oct. 15, 1973  France .............................. 73.36746

[52] U.S. Cl. .................. 310/93; 310/105; 310/268
[51] Int. Cl.² .......................................... H02K 49/04
[58] Field of Search ........ 310/93, 105, 103, 67, 268

[56] References Cited
UNITED STATES PATENTS

| | | | |
|---|---|---|---|
| 2,830,206 | 4/1958 | Bessieve | 310/93 |
| 2,833,945 | 5/1958 | Bessieve | 310/268 X |
| 2,836,742 | 5/1958 | Bessieve | 310/268 X |
| 2,957,093 | 10/1960 | Bessieve | 310/93 |
| 3,496,396 | 2/1970 | Jollois | 310/93 |

*Primary Examiner*—Donovan F. Duggan
*Attorney, Agent, or Firm*—Stevens, Davis, Miller & Mosher

[57] ABSTRACT

An eddy current retarder assembly comprises a field stator secured to a motor vehicle transmission casing and a rotor comprising at least one annular armature of ferromagnetic material situated on one side of the stator. The rotor comprises an annular hub bolted to a fixing plate rotatable with a shaft end emerging from the casing. The fixing plate is connected to one jaw of a vehicle transmission universal joint which comprises two joints and a spider having opposed trunnions, the one jaw carrying a fixing flange and the spider being housed inside the rotor. The one jaw of the universal joint comprises a first part which carries the fixing flange and is made in one piece with the fixing plate, a second part of the one jaw at least partly forming two bearings for the trunnions of the spider and being secured by locking bolts against the first part of the one jaw.

9 Claims, 4 Drawing Figures

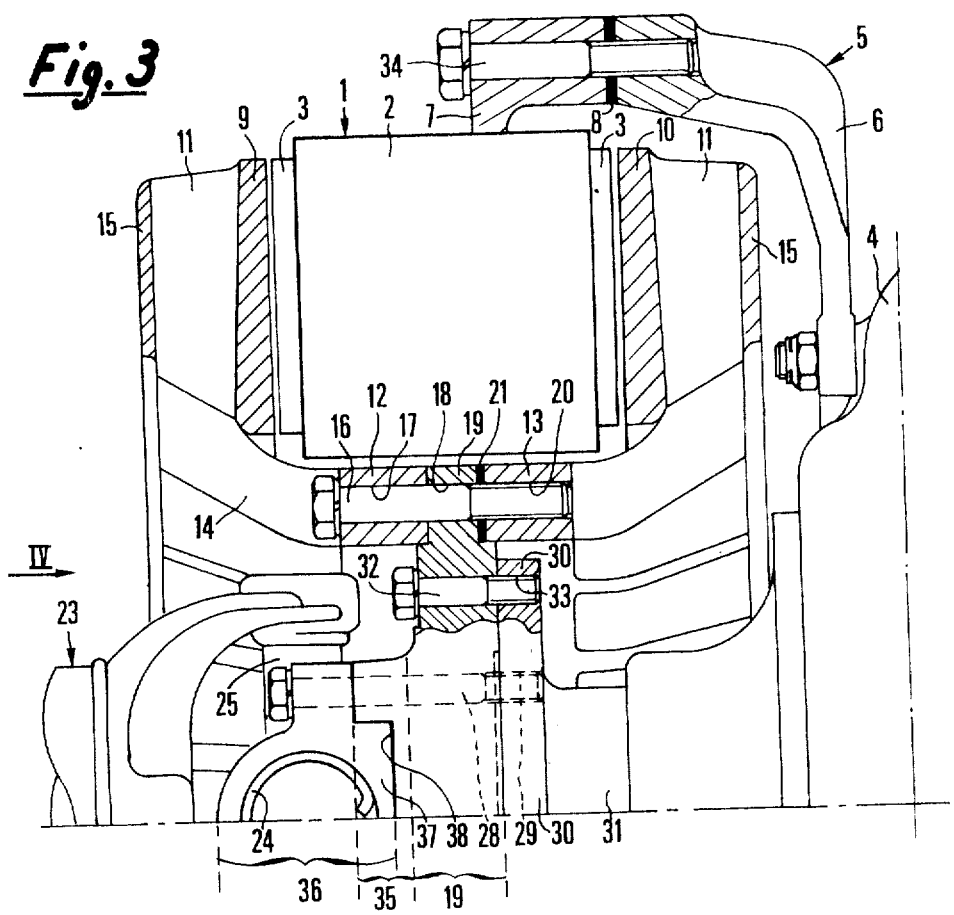
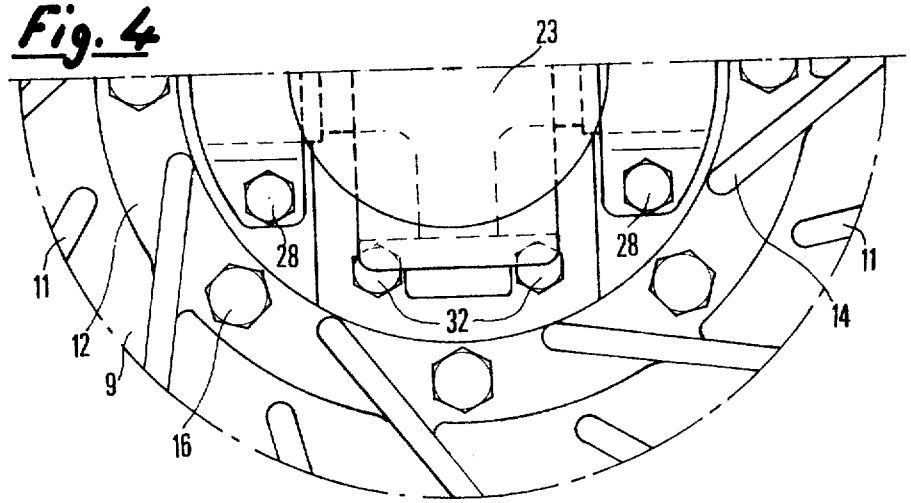

3,908,141

EDDY CURRENT RETARDER

BACKGROUND OF THE INVENTION

This invention relates to eddy current retarders.

In particular, the invention concerns retarders of the kind comprising a field stator provided with means for fixing on a motor vehicle transmission casing, such as a gearbox or back axle casing, a rotor comprising at least one annular armature of ferromagnetic material situated on one side of said stator and comprising an annular hub mounted by means of bolts on a fixing plate associated with a shaft and emerging from said casing, said plate being connected to a jaw of a vehicle transmission universal joint, said jaw terminating in a fixing flange, the universal joint spider being housed inside the rotor when the retarder is fitted to the vehicle.

A retarder of this kind is shown and described, for example, in U.S. Pat. No. 3,496,396 granted on Feb. 17, 1970.

In known retarders of this kind, the fixing plate bearing two annular armatures is clamped between their hubs by means of a ring of traversing axial bolts which thus keep the armatures connected.

The correct relative axial position of the annular armatures and of the stator must be adjusted with high accuracy, for example by means of shims inserted between the plate and the hubs and in the fixing means or the stator support on the casing.

Since the size of the retarder and the length of the universal joints necessitate that the end — i.e, the flange of the universal joint jaw — should be held as close as possible to to the gearbox or back axle casing, the universal joint is housed in a cavity radially defined by the armature and its annular hub farthest away from the casing, and axially by the fixing plate. Consequently, and allowing for the inside diameter of the hub and the radial dimension of the spider, the jaw flange locking bolts or nuts are inaccessible when the retarder is fitted. For this reason, when the universal joint transmission has to be removed, for example to change faulty needle bearing blocks, the rotor must first be removed to give access to the locking nuts or bolts, and this entails the risk of destroying the above-mentioned adjustment.

On re-fitting, the relative position of the armatures to one another or of one of the armatures with respect to the stator, must be re-adjusted on the vehicle. Such adjustment on the vehicle is also essential after certain repairs to the gearbox or back axle or when the armature or armatures and/or the stator of the retarder have to be changed.

SUMMARY OF THE INVENTION

One of the objects of the invention is to reduce the axial length of the retarder/universal joint assembly.

Another object is to enable the spdier of the universal joint and its outer jaw to be removed from the rotor.

Yet another object is to enable the rotor and stator to be removed from the gearbox or back axle and removed from the vehicle without affecting the initial adjustment.

According to the invention, a retarder of the kind specified is characterised in that the plate and a first part of said jaw adjacent the universal joint and comprising the flange are made in one piece, the second part of said jaw — which at least partly forms two bearings for two needle bearing members respectively of two opposite trunnions of the said spider — being locked by bolts against the said first part.

According to one embodiment, axial holes for the passage of fixing bolts of the plate on an end flange of the shaft end emerging from the casing are formed in said plate, the locking bolts of the said second part forming a part of the said fixing bolts for the plate on the said end flange.

Advantageously, the said axial holes are situated on a circle having the retarder axis as centre.

According to another embodiment, the said first part of the jaw, the said plate and the said shaft end are integral with one another.

The second jaw part in question may be made in the form of two capped bearings whose caps are locked by bolts on the first part.

It may also be made in the form of two bearings each being in one piece. Thus the two bearings remain connected to the spider in the event of any decoupling of the universal joint.

In the latter case, the junction surfaces of the said first and second parts at each bearing respectively have a preferably rectangular matching projecting and hollow part fitted one inside the other and so disposed as to transmit most of the transmission torque between the said first and second parts.

BRIEF DESCRIPTION OF THE DRAWINGS

The invention will be more readily understood from the following detailed description given with reference to the appended drawings which illustrate two preferred embodiments of the invention. In the drawings:

FIG. 3 is a second embodiment of the retarder shown in the same way as in FIG. 1; and FIG. 4 is a front view in the direction of arrow IV in FIG. 3 showing half of the central part of the assembly.

DESCRIPTION OF PREFERRED EMBODIMENTS

Figure 1:
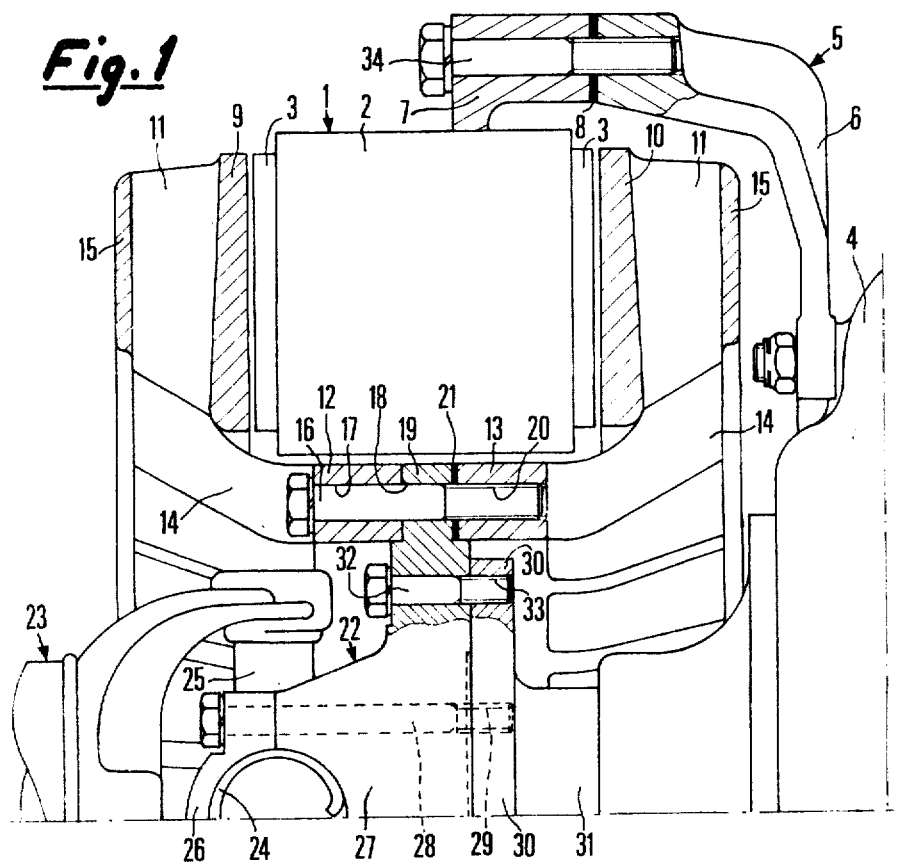
FIG. 1 is a sectional view of the top half of a first embodiment of a retarder according to the invention fitted on the back axle of a utility motor vehicle, a universal joint seen in side view being connected to the fixing plate.
Figure 2:
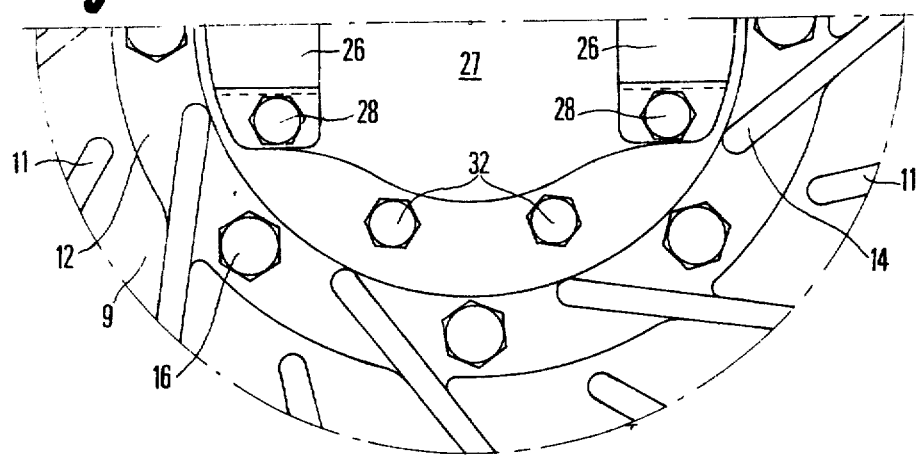
FIG. 2 is a half front view of the central part of the assembly shown in FIG. 1 with the universal joint spider removed.

The retarders shown by way of example in the drawings are retarders having a heteropolar stator and a rotor comprising two annular armature discs, as described and illustrated in U.S. Pat. No. 3,496,396 granted on Feb. 17, 1970.

Referring to FIG. 1, the stator 1 comprises a ring of coils 2, the cores of which terminate at each end in pole shoes 3. The stator is secured to the casing 4 of a back axle by fixing means 5 comprising one or more supports 6 and lugs 7. Adjusting shims 8 are inserted between the supports 6 and the lugs 7.

The rotor comprises two annular armatures discs 9 and 10 provided with cooling fins 11 and connected to sleeve-shaped hubs 12 and 13 by bent arms 14 which form a continuation of some of the fins and terminate at the free end faces of the hubs. An air guide plate 15 interconnects the fins.

Bolts 16 fitted in plain axial holes 17 and 18 respectively formed in the hub 12 of the annular armature disc 9 farthest away from the fixing means 5 and in a fixing plate 19 are screwed and clamped in screwthreaded holes 20 in the other hub 13, i.e. that of the armature disc 10 closest to said means. The bolts 16 thus keep the two armatures assembled in their correct relative position which is pre-set in relation to the stator 1 by means of shims 21 inserted between the plate 19 and the hub 13.

As will be seen from FIG. 1, the plate 19 constituted the flange of a flanged jaw 22 of a universal joint at one of the ends of a driving universal-joint transmission 23. The flange in question in this case coincides with an intermediate annular zone of the plate 19 which does not form any particular axial excess thickness on said plate. The two parts of the flanged jaw 22, which have bores 24 for the bearings of two opposite trunnions of a spider 25 are made in the form of two capped bearings, the caps 26 of which are secured to the jaw part 27 connected to the plate 19 by means of bolts 28 locked in screwthreaded holes 29 in an end flange 30 of a shaft end 31 emerging from the casing 4.

Other bolts 32 extend through the intermediate annular flange forming zone of the plate 19 and are secured in other screwthreaded holes 33 in the end flange 30.

The advantages of the invention are clear.

Firstly, the fact that the flange of the universal joint 22 and the fixing plate form a unitary piece 19 enables the number of constituent parts of the system to be reduced, thus giving a saving in material and labour, and also enables the axial length of the universal joint and retarder system to be reduced.

It is particularly easy to remove the retarder from the vehicle. All that is required is to unscrew the bolts 28 of the universal joint caps 26, withdraw the transmission 23 with the spider 25 and withdraw the assembly bolts 34 of the fixing means 5 and the bolts 32 locking the plate 19 on the end flange 30 so that the retarder can be removed directly and without complicated handling.

Also, the fact that the armatures 9 and 10 are in the correct relative positions both as regards the angle (balancing) and axially, to one another and in relation to the pole shoes 3 of the stator 1, and that this position is pre-set once and for all, means that removal of the retarder from the vehicle or simply removal of the rotor and stator from the back axle or gearbox, does not affect the presetting.

The second embodiment shown in FIGS. 3 and 4 is identical to the first, except that the two half-bearings of each bearing, one of which formed the cap 26 in the first embodiment, are made in one piece in this case. In this way, the bearings and the needles remain fitted on the spider 25, and hence on the actual universal joint, of the transmission 23 when the latter is removed from the retarder after unscrewing of the bolts 28, while the retarder remains fitted to the back axle or vehicle gearbox.

In order to allow correct location of the second part 36 of the joint on the first part 35 of the joint and relieve the four bolts 28 of most of the transmission torque, the second part 36 has on each bearing a wide rib 37 parallel to the axis of the bearings and of rectangular section, said rib being fitted in a matching groove or recess 38 formed in the first part 35. The profile of this rib and this recess will be apparent from FIG. 3.

Irrespective of which of the two embodiments described is used, the fact that the axes of the bolts 28 connecting the said first and second parts as disposed on either side of and well outside the first universal joint jaw connected to the transmission 23, said first jaw being offset at an angle of 90° to the second jaw which is connected to the plate 19, makes the heads of said bolts very accessible and enables the said first jaw and the spider to be readily separated from the rotor. It is thus possible to repair the universal joint without having to dismantle and withdraw the retarder. Also, removal of the first jaw and of the spider from the rotor gives access to the heads of the other bolts 32 which, after such removal, hold the plate 19 fixed on the flange 30, said heads situated at the bottom of the cavity of the rotor having been previously at least partially concealed or covered by the first jaw when the universal joint is fitted in the rotor cavity.

Of course, the invention is not limited to the exemplified embodiments described and illustrated but includes numerous variants accessible to those versed in the art, depending upon the application required and without departing from the scope of the invention.

For example, the invention may be applied, inter alia, to homopolar retarders having coaxial windings, cylindrical overlapped pole shoes, and a double-bell type rotor, such as the retarder described in U.S. Pat. No. 3,496,396, or a "single-bell" rotor.

Similarly, according to a modified embodiment (not shown), the said first part 27 or 35 of the universal joint, the plate 19 and the shaft end emerging from the gearbox or back axle may be made in one piece, the fixing "flange" mentioned above then being imaginary and being actually incorporated in the resulting monobloc torque transfer unit.

I claim:
1. An eddy current retarder assembly comprising:
   a motor vehicle transmission casing;
   a shaft end emerging from said casing;
   a vehicle transmission universal joint coupled to said shaft end;
   said universal joint comprising two jaws and a a spider having opposed trunnions;
   a fixing flange on one of said jaws of said universal joint;
   a fixing plate associated with said shaft end and connected to said one jaw;
   a field stator;
   means provided on said stator for fixing said stator to said casing;
   a rotor comprising at least one annular armature of ferromagnetic material situated on one side of said stator; and
   an annular hub on said stator secured to said fixing plate;
   said assembly being characterised by:
   said one jaw comprising a first part having said fixing flange and a second part which at least partly forms two bearings for said opposed trunnions of said spider;
   said fixing plate and said first part of said one jaw being made in one piece; and
   said second part of said one jaw being secured against said first part of said one jaw by locking bolts.

2. A retarder assembly as claimed in claim 1 comprising:
   an end flange formed on said shaft end and provided with screwthreaded holes; and
   fixing bolts to secure said fixing plate to said end flange;

said fixing plate being formed with axial holes therethrough for the passage of said fixing bolts;
said locking bolts and said fixing bolts of said one jaw having screwthreaded ends received in said screwthreaded holes of said end flange.

3. A retarder assembly as claimed in claim 2, wehrein said axial holes for the passage of said fixing and locking bolts are distributed over a circle having the axis of the retarder as centre.

4. A retarder assembly as claimed in claim 1, wherein said first part of said one jaw, said fixing plate and said shaft end are integral with one another.

5. A retarder assembly as claimed in claim 1, wherein said bearings for said trunnions are capped bearings having caps secured by said locking bolts directly on said first part of said one jaw.

6. A retarder assembly as claimed in claim 1, wherein each of said bearings for said trunnions is made in one piece.

7. A retarder assembly as claimed in claim 6, wherein said first and second parts of said one jaw have mating junction surfaces at each bearing, said junction surface respectively having matching projecting and hollow parts fitted one inside the other and so disposed as to transmit most of the transmission torque between said first and second parts.

8. A retarder assembly as claimed in claim 7, wherein said projecting part is formed by a rectangular lug connected to the corresponding bearing in said second part and said hollow part is formed by a matching rectangular recess in the said first part.

9. A retarder assembly as claimed in claim 1, wherein said spider is housed inside said rotor and said locking bolts have their axes disposed on either side of and well outside the other of said jaws of said universal joint.

* * * * *